Patented May 7, 1935

2,000,562

UNITED STATES PATENT OFFICE 2,000,562

PROCESS OF REMOVING RESIN FROM SULPHITE CELLULOSE

Gustaf Haglund, Stockholm, Sweden, assignor to Patentaktiebolaget Gröndal Ramen, Stockholm, Sweden No Drawing. Application November 20, 1933, Serial No. 698,873. In Sweden July 6, 1933

19 Claims. (Cl. 92—13)

This invention relates to the production of sulphite cellulose and has for an object the provision of an improved process for producing sulphite cellulose. More particularly, the invention contemplates the provision of an improved process for reducing the resin content of sulphite cellulose. A further object of the invention is to provide an improved process for removing resin from sulphite cellulose freed from waste liquor in the usual manner. The invention further contemplates the provision of an improved process for removing resin from sulphite cellulose which can be carried out with equipment usually available in the screening department of a sulphite mill and without interfering with the regular operations of the screening plant.

Cellulose pulp produced according to the sulphite process always contains a certain quantity of resin, greater or smaller depending on the content of resin in the crude material. If the crude material originates from wood rich in resin, e. g. pine, the content of resin in the pulp after it has been blown off from the digester and washed free from waste liquor may sometimes amount to more than 4%. A pulp having such a content of resin can not pass the screening department or be used satisfactorily for paper manufacture, and, consequently, it is of little or no value if the resin can not be removed or the content of resin reduced materially. Cellulose produced from spruce or other kinds of wood less rich in resins may also contain so much resin that the further treatment of the pulp will meet with difficulties.

The present invention provides a process for effectively removing resin from sulphite cellulose by means of de-resining agents such for example, as alkali metal hydroxides and burnt limestone. Processes involving the use of such de-resining agents proposed heretofore have not produced the desired results, principally because the removal of the resin has been incomplete and also because of the formation of a froth of resin which has given rise to spots in the pulp. Moreover, the processes proposed heretofore required the use of relatively large quantities of de-resining agents, and, consequently, they were expensive and, therefore, impracticable. Furthermore, the use of relatively large quantities of de-resining agents in accordance with the processes proposed heretofore results in lower recoveries of pulp and the production of pulp of inferior quality.

The resin, so-called, appearing in the pulp after digestion is not a product of uniform or definite composition, but a mixture of fatty acids, resinous acids and wax, and it does not occur equally distributed in the pulp. This is clearly seen when examining samples of cellulose which have been treated with Sudan-solution imparting a red color to the resinous particles. Part of the resin is to be found in a finely divided condition spread on the fibres of cellulose or attached to them in the form of small balls or grains. This part of the resin content of the cellulose may be properly termed "free resin", since it is comparatively easily exposed to the influence of chemicals. Another part of the resin is still enclosed in the original resin cells, and it is consequently comparatively well protected against the influence of chemicals, thanks to the surrounding cell partition, even if these cells can as a rule be supposed to be open at both ends. This latter part of the resin is herein termed "enclosed resin".

The influence or effect of a de-resining agent such, for example, as an alkali metal hydroxide when employed in various processes may be demonstrated as follows. If batches of recently made sulphite cellulose produced from pine wood and containing, after washing away the waste liquor, about 4% of resin are treated, while in the form of 10% pulp, i. e. containing 10% cellulose and 90% water or in a less concentrated form, with varying quantities of NaOH, corresponding to 0.5%, 1.0%, 3% and up to 20% NaOH, calculated on the dry weight of the pulp, at ordinary temperature and for periods of half an hour, one hour, two hours and up to three hours, the various batches, notwithstanding these very varying conditions, will have lost practically the same quantities of resin, and the remaining contents of resin will still be about 2%, which is considerably more than can be admitted for a technical cellulose. If the treated batches of pulp are now tested for the content of resin, it will be found that the part of the resin above termed "free resin" has been removed, whereas the resin enclosed in the resinous cells practically has not been affected and remains in the pulp.

If the treatments are repeated as in the foregoing but at an elevated temperature, the result will be practically the same unless the temperature is raised to about 100° C. or higher. At such high temperatures, the resin cells are attacked even by a 1.0% NaOH solution, and conditions are favorable for the setting free and dissolution of the resin. Moreover, a noticeable dissolution of the resin cells is effected also at a lower temperature by treating with a more concentrated solution, e. g. 10% NaOH solution. In both cases, however, part of the cellulose is destroyed and its character is modified adversely.

From a consideration of the cited experiments it is apparent that the resin of a sulphite cellulose rich in resin, in case the resin, as is generally the case, is to a considerable extent enclosed in the resin cells, can not be removed in a satisfactory way merely by treating the cellulose with alkali of a moderate concentration and at such a low temperature as to do no harm to the cellulose.

The present invention provides means for removing practically all the resin from a sulphite cellulose by using very small quantities of alkali, for example, about 1% NaOH, calculated on the dry pulp, or less, depending on the resin of the pulp and using low temperatures, for example, temperatures at or below ordinary room temperature. The use of more alkali or high temperatures is naturally no hindrance to carrying through the process, but would increase the costs unnecessarily and entail risk of a decrease of the recovery and undesirable modification of the character of the pulp.

In the method of the present invention, the resin enclosed in the resin cells is liberated and rendered accessible to the influence of the alkali.

According to a preferred method of the invention, sulphite pulp in the aqueous condition together with a quantity of a de-resining agent, such, for example, as hydroxide of an alkali metal, quick lime or calcium hydroxide, adjusted to the resin content of the pulp, is submitted to a mechanical treatment such that the resin enclosed in the resin cells, without undesirable breaking down of the cell walls, is set free from the cells and exposed to the influence of the de-resining agent. The mechanical treatment is preferably continued until practically all the resin of the cellulose is saponified or emulsified, whereupon the resinous soap or the emulsion is separated from the cellulose.

The mechanical treatment should not, as suggested above, be so intense that undesirable breaking down of the cell walls takes place, as, in such a case, aggregation and sticking together of the originally finely divided resin would take place and the saponification and emulsification of the resin would be greatly hampered.

The mechanical treatment is designed to effect a squeezing and pressing of the resin cells so that the resin is driven out from them in order that it may be exposed to the influence of the de-resining agent outside the cells. The apparatus employed should, therefore, be of such a construction as to allow of the treatment of a pulp in such a manner that the fibres, without being destroyed, are separated from one another and also are rubbed so vigorously that the resin enclosed in the resin cells will be set free. The accomplishment of this desirable result is substantially facilitated if the product has a high fibre concentration.

A suitable apparatus for carrying out such a mechanical treatment is, for instance, the so-called pulp separator, employed in the sulphite mills, and consisting of an almost horizontally arranged chamber or drum with a rotary central shaft provided with radially placed pegs or fingers.

Provided that the cellulose has a suitable water content, the treatment of the pulp in such an apparatus is sufficiently intense to set free the resin from the cells without effecting agglomeration of the small particles into large grains that would be difficult to saponify or emulsify.

The water content of the cellulose treated is preferably kept comparatively low, for instance at about 90%, as thereby the setting free of the resin in the cells is facilitated, the formation of froth is hindered and the emulsification of the nonsaponifiable compounds of the resin is more complete. If the water content of the pulp is too high, formation of froth may occur and cause the formation of resinous aggregations which, on account of their size, can not be dissolved or emulsified and which consequently give the pulp an inferior value even if the content of resin is as a whole low. According to the preferred process of the invention, the treatment of the cellulose with the de-resining agent is carried out without access of air. It is also desirable to avoid the incorporation of large quantities of air in the pulp prior to treatment.

According to the preferred process of the invention, the pulp to be de-resined is taken directly from the blow pits, concentrated, if this should be required, so that the fibre concentration is for instance 10 to 15%, and conducted or conveyed to the de-resining apparatus by sluicing, pumping or the like, with the least possible mechanical treatment, admittance of air to the treatment chamber of the de-resining apparatus being avoided as much as possible. The de-resining agent, for instance hydrate of an alkali metal or burnt lime may be added in a solid form, as a solution, or as a suspension, either directly to the apparatus or during the transport of the pulp to the apparatus. The treatment may be carried out as a continuous operation in one or more pieces of apparatus through which the pulp is made to pass or as a batch operation. The treatment is preferably continued until practically all the resin of the cellulose is saponified or emulsified, whereupon the resinous soap or the emulsion is separated from the cellulose in any suitable manner, for instance, by dilution with water and filtering or decanting. If the pulp, as is supposed in this case, has not already passed the screening plant where hard, undigested pieces such as knots etc. are removed, the de-resined pulp after being freed from resinous soap is then taken directly to the screening plant where it is treated in the ordinary way.

If the content of resin is high, it is necessary to de-resin the pulp before taking it to the screening plant as otherwise the apparatus will be easily choked by the resin. If, on the other hand, the content of resin of the pulp is low, the de-resining can be profitably done after the pulp has passed the screening.

The process described above has given excellent results in practice and has shown special advantages when the pulp treated has been produced according to the alkali bisulphite method. Thus, in treating pulp taken from the blow pits with a 0.1% NaOH solution at ordinary room temperature for 10–20 minutes, 90% or more of the resin content has been removed.

If a pulp of a very low resin content is to be produced or if a very low alkali consumption should be desired, it may be profitable to pass the pulp through several de-resining chambers or vessels whereby the alkali and the lime are added in portions in the different chambers or vessels. It may then be appropriate, between the treatment in the different chambers or vessels to purify the pulp by filtering or decanting, for instance in such a way that the pulp after having passed a de-resining chamber or vessel is diluted with water, of which a certain quantity together with resinous soap or emulsion is removed so that the pulp is concentrated before entering the next de-resining chamber or vessel. This manner of removing the resinous soap or the emulsion by dilution and concentration of the pulp may also be profitably applied after the de-resining has been finished and the pulp taken to the screens. By carrying through this treatment in a careful way it has been proved that an undesirable formation of froth in the screens can be avoided.

Another way of avoiding the formation of froth consists in wholly or partially neutralizing the mass with an acid after de-resining and before the treatment in the screening plant.

I claim:

1. The method of removing resin from cellulose pulp which comprises subjecting the pulp to a squeezing operation to force the resin from resin cells in which it is enclosed without causing undesirable breaking of the cell walls, and subjecting the resulting pulp to the action of a de-resining agent.

2. The method of removing resin from cellulose pulp which comprises subjecting the pulp to a squeezing operation in the presence of a de-resining agent to force the resin from resin cells in which it is enclosed without causing undesirable breaking of the cell walls and to saponify and emulsify substantially all of the components of the resin.

3. The method of removing resin from sulphite cellulose which comprises subjecting the cellulose to a squeezing operation in the presence of a de-resining agent until the components of substantially all of the resin contained therein have been emulsified and saponified, the squeezing operation being so regulated as to avoid substantial breaking of the cell walls, and the amount and concentration of the de-resining agent being such that harmful modification of the cellulose is avoided.

4. The method of removing resin from sulphite cellulose which comprises subjecting a pulp of the cellulose to a squeezing operation in the presence of a de-resining agent to force the resin from resin cells in which it is enclosed without causing undesirable breaking of the cell walls and to effect saponification and emulsification of the components of substantially all of the resin contained in the pulp, and separating the resulting resin derivatives from the cellulose.

5. The method of removing resin from sulphite cellulose which comprises subjecting a pulp of the cellulose to a squeezing operation in the presence of a de-resining agent to force the resin from resin cells in which it is enclosed without causing undesirable breaking of the cell walls and to effect saponification and emulsification of the components of substantially all of the resin contained in the pulp, the fibre concentration of the pulp treated being regulated to avoid the production of an undesirable quantity of froth, and separating the resulting resin derivatives from the cellulose.

6. The method of removing resin from sulphite cellulose which comprises subjecting a pulp of the cellulose having a fibre concentration of about 10 to 15% to a squeezing operation in the presence of a de-resining agent to force the resin from resin cells in which it is enclosed without causing undesirable breaking of the cell walls and to effect saponification and emulsification of the components of substantially all of the resin contained in the pulp, and separating the resulting resin derivatives from the cellulose.

7. The method of removing resin from sulphite cellulose which comprises subjecting a pulp of the cellulose to a squeezing operation in the presence of a de-resining agent and without access of air to force the resin from resin cells in which it is enclosed without causing undesirable breaking of the cell walls and to effect saponification and emulsification of the components of substantially all of the resin contained in the pulp, and separating the resulting resin derivatives from the cellulose.

8. The method of removing resin from sulphite cellulose which comprises subjecting a pulp of the cellulose to a squeezing operation in the presence of a de-resining agent and without access of air to force the resin from resin cells in which it is enclosed without causing undesirable breaking of the cell walls and to effect saponification and emulsification of the components of substantially all of the resin contained in the pulp, the fibre concentration of the pulp treated being regulated to avoid the production of an undesirable quantity of froth, and separating the resulting resin derivatives from the cellulose.

9. The method of removing resin from sulphite cellulose which comprises subjecting a pulp of the cellulose having a fibre concentration of about 10 to 15% to a squeezing operation in the presence of a de-resining agent and without access of air to force the resin from resin cells in which it is enclosed without causing undesirable breaking of the cell walls and to effect saponification and emulsification of the components of substantially all of the resin contained in the pulp, and separating the resulting resin derivatives from the cellulose.

10. The method of removing resin from sulphite cellulose which comprises subjecting a pulp of the cellulose to a squeezing operation in the presence of a de-resining agent at a temperature not substantially higher than normal room temperature to force the resin from resin cells in which it is enclosed without causing undesirable breaking of the cell walls and to effect saponification and emulsification of the components of substantially all of the resin contained in the pulp, and separating the resulting resin derivatives from the cellulose.

11. The method of removing resin from sulphite cellulose which comprises subjecting a pulp of the cellulose to a squeezing operation in the presence of a de-resining agent at a temperature not substantially higher than normal room temperature to force the resin from resin cells in which it is enclosed without causing undesirable breaking of the cell walls and to effect saponification and emulsification of the components of substantially all of the resin contained in the pulp, the amount of de-resining agent employed being equivalent to an amount of sodium hydroxide not exceeding about 1% of the weight of the cellulose in the pulp, and separating the resulting resin derivatives from the cellulose.

12. The method of removing resin from sulphite cellulose which comprises subjecting a pulp of the cellulose to a sqeezing operation in the presence of a de-resining agent at a temperature not substantially higher than room temperature to force the resin from resin cells in which it is enclosed without causing undesirable breaking of the cell walls and to effect saponification and emulsification of the components of substantially all of the resin contained in the pulp, the fibre concentration of the pulp treated being regulated to avoid the production of an undesirable quantity of froth and the amount of de-resining agent employed being equivalent to an amount of sodium hydroxide not exceeding about 1% of the weight of the cellulose in the pulp, and separating the resulting resin derivatives from the cellulose.

13. The method of removing resin from sulphite cellulose which comprises subjecting a pulp of the cellulose having a fibre concentration of about 10 to 15% to a squeezing operation in the presence of a de-resining agent at a temperature not substantially higher than normal room temperature to force the resin from resin cells in which it is enclosed without causing undesirable breaking of the cell walls and to effect saponification and emulsification of the components of substantially all of the resin contained in the pulp, the amount of de-resining agent employed being equivalent to an amount of sodium hydroxide not exceeding about 1% of the weight of the cellulose in the pulp, and separating the resulting resin derivatives from the cellulose.

14. The method of removing resin from sulphite cellulose which comprises subjecting a pulp of the cellulose to a squeezing operation in the presence of a de-resining agent and without access of air at a temperature not substantially higher than normal room temperature to force the resin from resin cells in which it is enclosed without causing undesirable breaking of the cell walls and to effect saponification and emulsification of the components of substantially all of the resin contained in the pulp, the amount of de-resining agent employed being equivalent to an amount of sodium hydroxide not exceeding about 1% of the weight of the cellulose in the pulp, and separating the resulting resin derivatives from the cellulose.

15. The method of removing resin from sulphite cellulose which comprises subjecting a pulp of the cellulose to a squeezing operation in the presence of a de-resining agent and without access of air at a temperature not substantially higher than normal room temperature to force the resin from resin cells in which it is enclosed without causing undesirable breaking of the cell walls and to effect saponification and emulsification of the components of substantially all of the resin contained in the pulp, the fibre concentration of the pulp treated being regulated to avoid the production of an undesirable quantity of froth, the amount of de-resining agent employed being equivalent to an amount of sodium hydroxide not exceeding about 1% of the weight of the cellulose in the pulp, and separating the resulting resin derivatives from the cellulose.

16. The method of removing resin from sulphite cellulose which comprises subjecting a pulp of the cellulose having a fibre concentration of about 10 to 15% to a squeezing operation in the presence of a de-resining agent and without access of air at a temperature not substantially higher than normal room temperature to force the resin from resin cells in which it is enclosed without causing undesirable breaking of the cell walls and to effect saponification and emulsification of the components of substantially all of the resin contained in the pulp, the amount of de-resining agent employed being equivalent to an amount of sodium hydroxide not exceeding about 1% of the weight of the cellulose in the pulp, and separating the resulting resin derivatives from the cellulose.

17. The method of removing resin from sulphite cellulose which comprises subjecting a pulp of the cellulose to two or more squeezing operations in the presence of a de-resining agent to force the resin from resin cells in which it is enclosed without causing undesirable breaking of the cell walls and to effect saponification and emulsification of the components of substantially all of the resin contained in the pulp, and separating the resulting resin derivatives from the cellulose.

18. In a process for producing sulphite cellulose, the improvement which comprises subjecting the sulphite pulp prior to screening to a squeezing operation in the presence of a de-resining agent until the components of substantially all of the resin contained therein have been emulsified and saponified, the squeezing operation being so regulated as to avoid substantial breaking of the cell walls, and the amount and concentration of the de-resining agent being such that harmful modification of the cellulose is avoided.

19. In a process for removing resin from sulphite pulp involving the treatment of the pulp with an alkaline de-resining agent, the improvement which comprises subjecting the pulp after the de-resining treatment to the action of an acid to neutralize the pulp and avoid the formation of an undesirable quantity of froth in subsequent treatment operations.

GUSTAF HAGLUND.